US008981706B2

(12) United States Patent
Uryu

(10) Patent No.: US 8,981,706 B2
(45) Date of Patent: Mar. 17, 2015

(54) ELECTRIC MOTOR DRIVE APPARATUS AND ELECTRIC POWER STEERING APPARATUS HAVING THE SAME

(71) Applicant: Denso Corporation, Kariya, Aichi-pref. (JP)

(72) Inventor: Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 179 days.

(21) Appl. No.: 13/903,358

(22) Filed: May 28, 2013

(65) Prior Publication Data
US 2013/0320905 A1    Dec. 5, 2013

(30) Foreign Application Priority Data
May 30, 2012    (JP) ................................. 2012-122861

(51) Int. Cl.
H02P 27/04    (2006.01)
H02K 11/00    (2006.01)
(Continued)

(52) U.S. Cl.
CPC ............ H02K 11/001 (2013.01); B62D 5/0403 (2013.01); B62D 5/046 (2013.01); B62D 5/0484 (2013.01); B62D 5/0487 (2013.01);
(Continued)

(58) Field of Classification Search
CPC ...... B62D 5/046; B62D 5/0487; H02H 7/122; H02P 29/021
USPC ............... 318/114, 128, 139, 400.01, 400.14, 318/400.15, 430, 432, 437, 722, 799, 800, 318/801; 74/388 PS; 123/192.1; 280/207
See application file for complete search history.

(56) References Cited

U.S. PATENT DOCUMENTS 7,161,323 B2 * 1/2007 Ajima et al. .................. 318/629
2011/0156623 A1 * 6/2011 Nakamura et al. ....... 318/400.02
(Continued)

FOREIGN PATENT DOCUMENTS

JP    8-201233    8/1996
JP    9-119339    5/1997
(Continued)

OTHER PUBLICATIONS

Office Action (2 pages) dated May 1, 2014, issued in corresponding Japanese Application No. 2012-122861 and English translation (2 pages).

Primary Examiner — Antony M Paul
(74) Attorney, Agent, or Firm — Nixon & Vanderhye PC

(57) ABSTRACT

An electric motor drive apparatus includes multiple inverter sections arranged corresponding to winding sets of a motor, multiple relays that controls power supplies to the inverter sections, and a control unit. Each inverter section and corresponding winding set are referred to as a system. The control unit includes an obtaining section that obtains a winding current, a determination section that determines a fault occurrence, a specifying section that specifies a faulty system in which the fault occurs, an interrupting section that controls the relay corresponding to the faulty system to interrupt the power supply to the faulty system, and a vibrating section that controls the inverter section of a properly-operating system to add a vibration to an output torque from the electric motor. The vibrating section gradually increases a vibration component of the vibration added to the output torque from the electric motor.

8 Claims, 9 Drawing Sheets

(51) Int. Cl.
*B62D 5/04* (2006.01)
*H02P 29/02* (2006.01)
*H02P 5/52* (2006.01)
*H02H 7/08* (2006.01)
*H02H 7/122* (2006.01)

(52) U.S. Cl.
CPC .............. *H02P29/021* (2013.01); *H02P 5/526* (2013.01); *H02H 7/0838* (2013.01); *H02H 7/122* (2013.01)
USPC ........... 318/801; 318/114; 318/128; 318/430; 318/432; 318/800; 74/388 PS

(56) References Cited

U.S. PATENT DOCUMENTS

| | | |
|---|---|---|
| 2011/0156627 A1 | 6/2011 | Nakamura et al. |
| 2011/0156629 A1 | 6/2011 | Satou et al. |
| 2011/0316466 A1 | 12/2011 | Uryu |

FOREIGN PATENT DOCUMENTS

| | | |
|---|---|---|
| JP | 2005-304119 | 10/2005 |
| JP | 2010-137774 | 6/2010 |

* cited by examiner

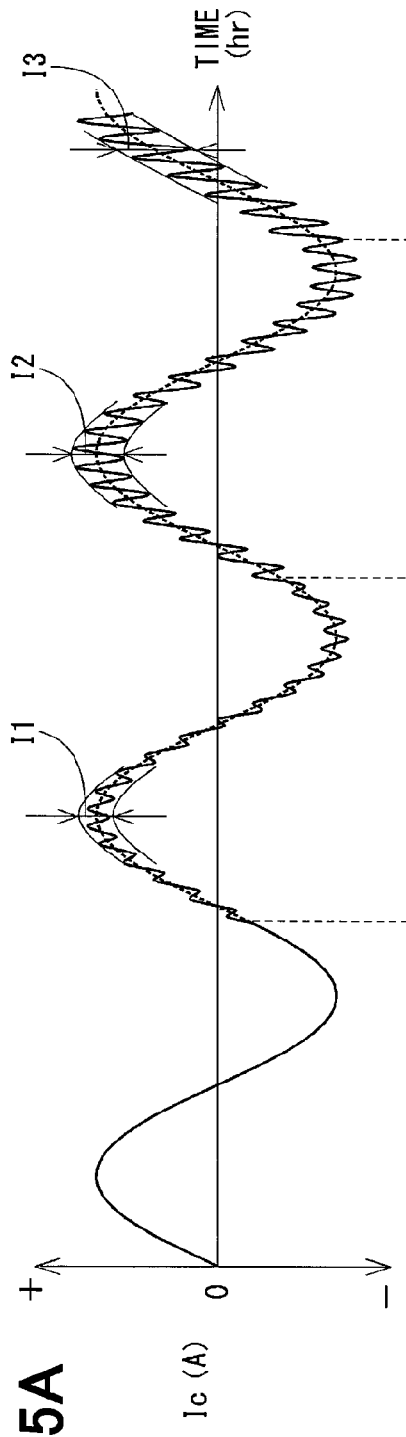
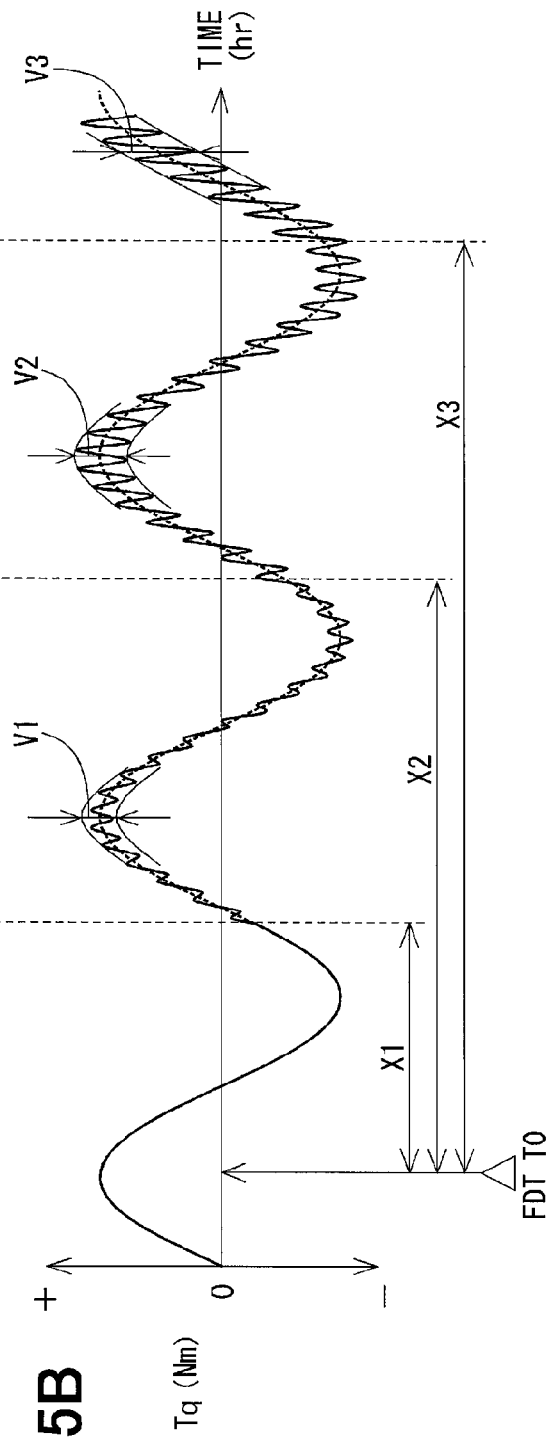
FIG. 5A
FIG. 5B

US 8,981,706 B2

ELECTRIC MOTOR DRIVE APPARATUS AND ELECTRIC POWER STEERING APPARATUS HAVING THE SAME

CROSS REFERENCE TO RELATED APPLICATION

This application is based on Japanese Patent Application No. 2012-122861 filed on May 30, 2012, the disclosure of which is incorporated herein by reference.

TECHNICAL FIELD

The present disclosure relates to an electric motor drive apparatus and an electric power steering apparatus having the same.

BACKGROUND

Conventionally, an electric motor drive apparatus includes multiple sets of windings corresponding to respective inverters. Hereinafter, a unit in which a winding set and the corresponding inverter are combined is also referred to as a system. Thus, the conventional electric motor drive apparatus includes multiple systems. In the conventional electric motor drive apparatus, when a fault occurs in one of the systems, which is also referred to as a faulty system, the faulty system stops operation. Then, another system, which is also referred to as a properly-operating system, starts operation in order to drive the electric motor. However, when another system is switched to operate when the fault occurs in one system, the fault occurred in the one system is not notified to a user. Thus, the user may continue to use the electric motor drive apparatus without any concern.

In an electric motor drive apparatus disclosed in JP 2012-25373 A, the fault occurred in one of the systems is notified to the user by the following configuration. In the electric motor drive apparatus, a vibration component having a predetermined frequency and a predetermined amplitude is added to a current command value related to a driving of the inverter included in the properly-operating system when the fault occurs in one of the systems. With this configuration, the user is notified of the fault occurred in one of the systems.

When applying the electric motor drive apparatus disclosed in JP 2012-25373 A to an electric power steering apparatus, the vibration component added to the torque may be perceived by the user as a fault occurred in the apparatus or as a discomfort feeling of steering a steering wheel. That is, the vibration component added to the torque may be differently perceived person by person. It is difficult to set the vibration component added to the torque so that the vibration component is surely perceived as the fault occurred in the apparatus to all of the users.

SUMMARY

In view of the foregoing difficulties, it is an object of the present disclosure to provide an electric motor drive apparatus that notifies a user of a fault and an electric power steering apparatus having the same.

According to a first aspect of the present disclosure, an electric motor drive apparatus, which drives an electric motor having a plurality of winding sets, includes a plurality of inverter sections, a plurality of relays, and a control unit. Each of the inverter sections is arranged corresponding to one of the winding sets. A unit including each of the inverter sections and corresponding one of the winding sets is referred to as a system. Each of the relays controls a power supply to one of the inverter sections. The control unit controls the inverter sections and the relays. The control unit includes an obtaining section, a determination section, a specifying section, and an interrupting section. The obtaining section obtains a winding current that flows through each of the systems. The determination section determines whether a fault occurs in the systems based on the winding current flowing through each of the systems. The specifying section specifies one of the systems in which the fault occurs as a faulty system when the determination section determines that the fault occurs in the systems. One of the systems other than the faulty system being referred to as a properly-operating system. The interrupting section controls one of the relays corresponding to the faulty system to interrupt the power supply to the faulty system. The vibrating section controls the inverter section of the properly-operating system to add a vibration to an output torque from the electric motor after the determination section determines that the fault occurs in the faulty system. The vibrating section gradually increases a vibration component of the vibration added to the output torque from the electric motor.

With the above apparatus, the fault occurred in one of the systems is appropriately notified to the driver with a maintaining of a steering assist to the driver.

According to a second aspect of the present disclosure, an electric power steering apparatus includes the electric motor drive apparatus according to the first aspect.

With the above apparatus, the fault occurred in one of the systems is appropriately notified to the driver with a maintaining of a steering assist to the driver.

BRIEF DESCRIPTION OF THE DRAWINGS

The above and other objects, features and advantages of the present disclosure will become more apparent from the following detailed description made with reference to the accompanying drawings. In the drawings:

FIG. 5A is a waveform diagram showing a current command value when the vibrating process is executed according to the first embodiment;

FIG. 5B is a waveform diagram showing a steering torque when the vibrating process is executed according to the first embodiment;

DETAILED DESCRIPTION

The following will describe an electric motor drive apparatus and an electric power steering apparatus having the same with reference to the drawings.

First Embodiment

Figure 1:
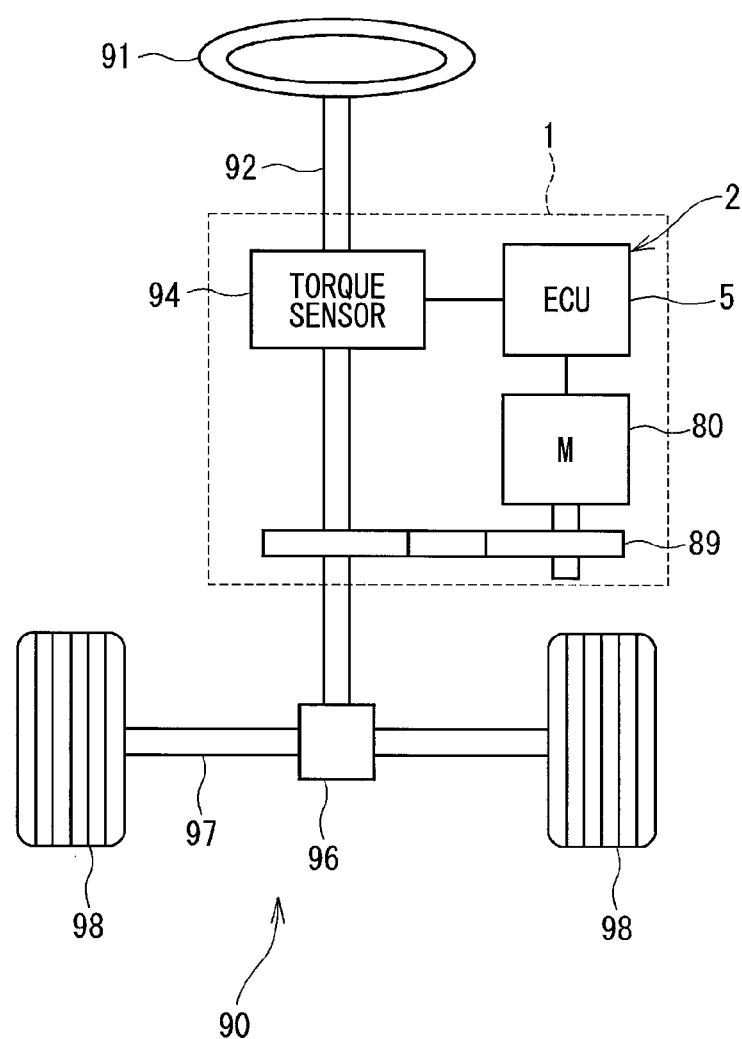
FIG. 1 is a diagram showing a configuration of a steering system according to a first embodiment of the present disclosure.
Figure 2:
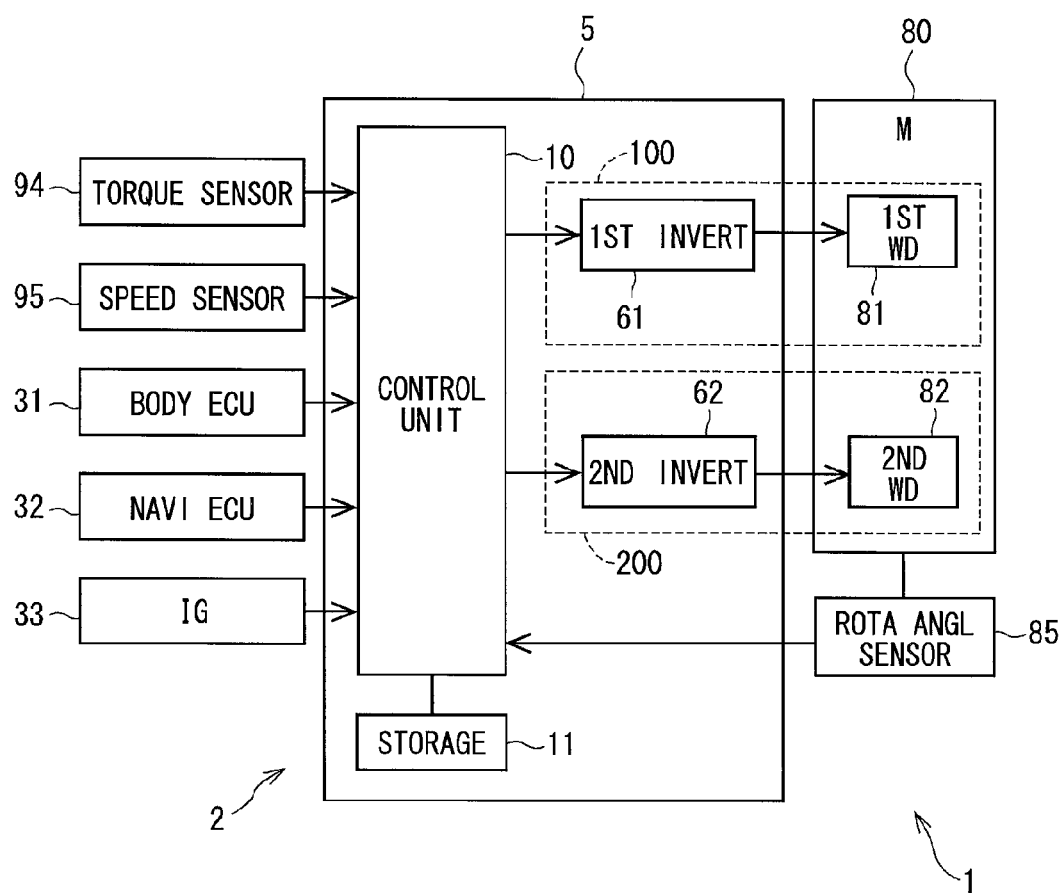
FIG. 2 is a block diagram showing a configuration of an electric power steering apparatus according to the first embodiment.
Figure 3:
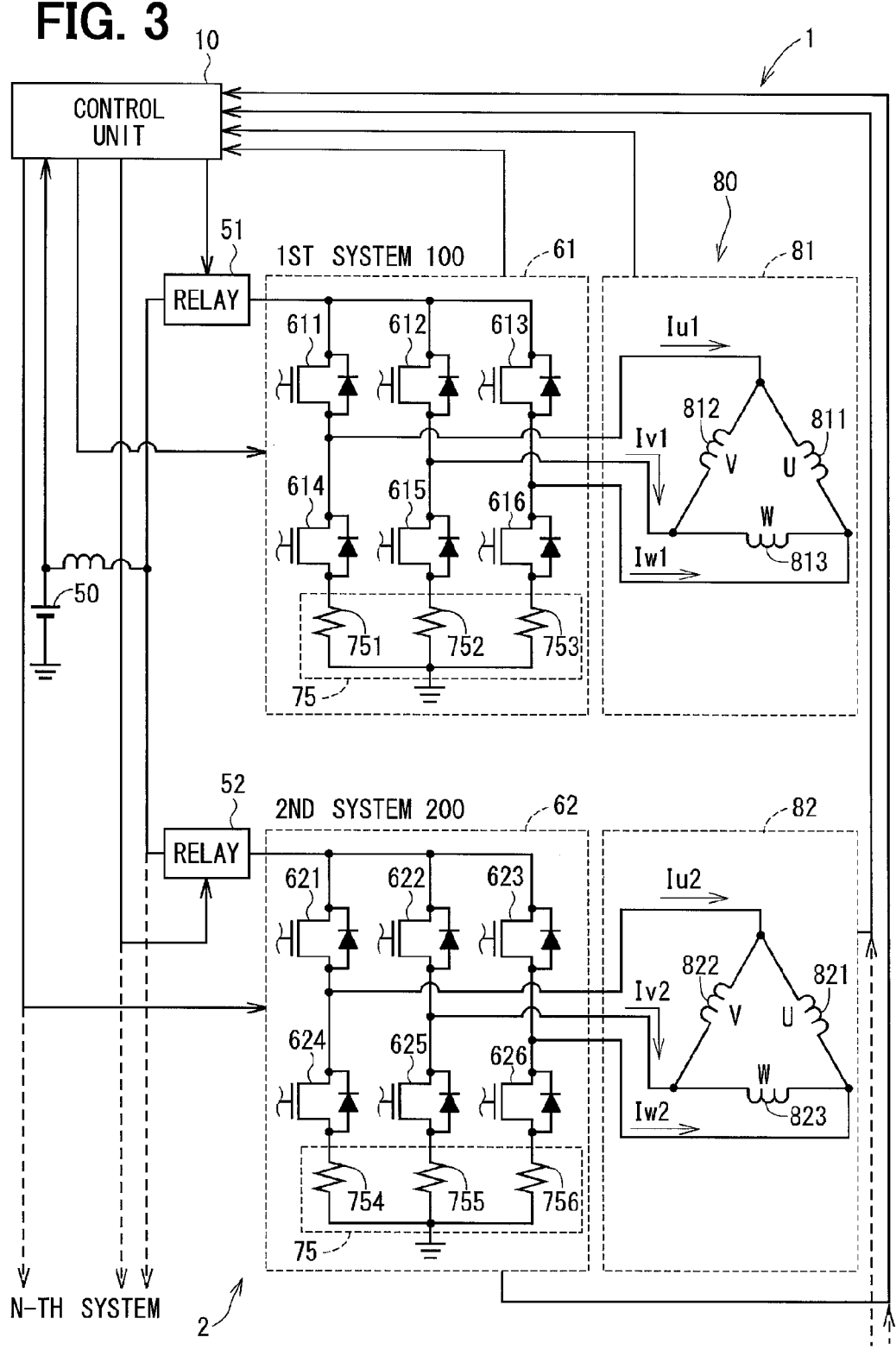
FIG. 3 is a circuit diagram showing the electric power steering apparatus according to the first embodiment.

An electric motor drive apparatus 2 according to the present embodiment is applied to an electric power steering apparatus 1. FIG. 1 to FIG. 3 show the electric power steering apparatus 1.

As shown in FIG. 1, a steering system 90 includes the electric power steering apparatus 1, a steering wheel 91, and a steering shaft 92. The steering wheel 91, which is operated by a driver, is connected to the steering shaft 92. Further, a pinion gear 96 is arranged at an end of the steering shaft 92. The pinion gear 96 engages with a rack 97. At both ends of the rack 97, a pair of wheels 98 to which a pair of tires are equipped are rotatably coupled to the rack 97 via tie-rods. With this configuration, when the driver rotates the steering wheel 91, a rack and pinion structure including the pinion gear 96 and the rack 97 converts a rotational motion of the pinion gear 96 to a linear motion of the rack 97. Thus, each of the wheels 98 rotates by an angle corresponding to a displacement of the rack 97 in a linear direction. Further, a torque sensor 94 is equipped to the steering shaft 92. The torque sensor 94 detects a steering torque Tq applied to the steering wheel 91.

The electric power steering apparatus 1 includes the electric motor drive apparatus 2, an electric motor (M) 80, and a gear 89. The electric motor 80 outputs an assistance torque to assist the driver to steer the steering wheel 91. The electric motor 80 is provided by a three-phase brushless motor that rotates the gear 89 in a clockwise direction and a counter-clockwise direction. The electric motor 80 will be described in detail later. The gear 89 reduces a rotation speed of the electric motor 80, and transmits the reduced rotational motion of the electric motor 80 to the steering shaft 92. By this configuration, the electric power steering apparatus 1 transmits, to the steering shaft 92, the assistance torque corresponding to a steering direction of the steering wheel 91 and the steering torque Tq. The assistance torque is output from the electric motor 80, thus, the assistance torque is also referred to as an output torque, hereinafter.

The electric motor drive apparatus 2 includes an electronic control unit (ECU) 5. As shown in FIG. 2 and FIG. 3, the ECU 5 includes a control unit 10, a storage unit (STORAGE) 11, an inverter unit including a first inverter section (1ST INVERT) 61 and a second inverter section (2ND INVERT) 62, and a relay unit including a first relay 51 and a second relay 52.

The control unit 10 is provided by a microcomputer that includes a central processing unit (CPU), a read-only memory (ROM), an input/output interface (I/O), and a bus that couples the CPU, the ROM and the I/O. As shown in FIG. 2 and FIG. 3, the control unit 10 is coupled to the torque sensor 94, a speed sensor 95, a rotation angle sensor (ROTA ANGL SENSOR) 85, and a current detection unit including a first current detector 75a and a second current detector 75b. The first current detector 75a includes shunt resistors 751, 752, 753. The second current detector 75b includes shunt resistors 754, 755, 756. The torque sensor 94 detects the steering torque Tq. The speed sensor 95 detects a speed SP of a vehicle to which the electric power steering apparatus 1 is equipped. The first current detector 75a and the second current detector 75b detect multiple-phase currents flowing through the electric motor 80. The rotation angle sensor 85 detects a rotation angle theta ($\theta$) of the electric motor 80. The control unit 10 controls the first inverter section 61 and the second inverter section 62 based on the steering torque Tq, the speed of the vehicle, the currents in respective phases of the electric motor 80 and the rotation angle $\theta$ of the electric motor 80 in order to control a driving of the electric motor 80.

The control unit 10 is configured to obtain multiple information from a body ECU 31 and a navigation (NAVI) ECU 32 via a controller area network (CAN). The body ECU 31 controls multiple meters (not shown). The navigation ECU 32 controls a navigation system (not shown). The control unit 10 is also configured to obtain information related to an operation performed to an ignition switch (IG) 33. The operation may be a turning on of the ignition switch 33 or a turning off of the ignition switch 33.

The storage unit 11 stores multiple information including present time information. In the present embodiment, the storage unit 11 is provided by an electrically erasable programmable read-only memory (EEPROM). In FIG. 2, the control unit 10 and the storage unit 11 are separate from each other. Further, the control unit 10 and the storage unit 11 may be provided by one microcomputer.

In the present embodiment, the electric motor 80 includes a first winding set (1ST WD) 81 and a second winding set (2ND WD) 82. The first inverter section 61 is arranged corresponding to the first winding set 81, and the second inverter section 62 is arranged corresponding to the second winding set 82. In the present embodiment, a structure in which one winding set is combined with a corresponding inverter section is also referred to as a system. Thus, as shown in FIG. 2 and FIG. 3, the electric power steering apparatus 1 according to the present embodiment includes a first system (1ST SYSTEM) 100, which has the first winding set 81 and the first inverter section 61, and a second system (2ND SYSTEM) 200, which has the second winding set 82 and the second inverter section 62. The electric motor 80 according to the present embodiment is driven by the first system 100 and the second system 200. Further, the number N of the systems to drive the electric motor may be three or more. Herein, the number N is an integer equal to or greater than three. When there are equal to or more than three systems, the three or more systems are coupled in parallel.

The following will describe a circuit configuration of the electric power steering apparatus 1 with reference to FIG. 3. The electric motor 80 includes a stator, a rotor and a shaft, which are not shown. The rotor rotates together with the shaft. The rotor has a permanent magnet that is attached to an outer surface of the rotor. The rotor has a magnetic pole provided by the permanent magnet. The stator receives the rotor inside of the stator, and supports the rotor so that the rotor is rotatable inside of the stator. The stator includes multiple protruded sections, which are protruded radially inwards from an inner surface of the stator. The multiple protruded sections are arranged separate from each other at a predetermined rotational angle. A coil is wound around each protruded section. The coils wound around protruded sections include a U1 coil 811, a V1 coil 812, a W1 coil 813, a U2 coil 821, a V2 coil 822, and a W2 coil 823. The U1 coil 811, the V1 coil 812, and the W1 coil 813, which having a delta configuration, operate as the first winding set 81. The U2 coil 821, the V2 coil 822, and the W2 coil 823, which have a delta configuration, operate as the second winding set 82. Hereinafter, the first winding set 81 and the second winding set 82 are also referred to as a winding set.

As shown in FIG. 2, the electric motor 80 is coupled to the rotation angle sensor 85 that detects the rotation angle $\theta$ of the rotor of the electric motor 80. Hereinafter the rotation angle $\theta$ of the rotor of the electric motor 80 is also referred to as the rotation angle $\theta$. In the present embodiment, the rotation angle sensor 85 is provided by a resolver. The rotation angle $\theta$ may also be estimated based on a voltage signal corresponding to each phase of the electric motor 80 and a current signal corresponding to each phase of the electric motor 80. Thus, the rotation angle sensor 85 may be removed from the configuration.

As shown in FIG. 3, the first inverter section 61 is provided by a three-phase inverter, which includes six switching elements 611 to 616 connected in a bridge circuit structure. The six switching elements 611 to 616 switch a power supply to the U1 coil 811, the V1 coil 812 and the W1 coil 813 included in the first winding set 81 of the electric motor 80. The first relay 51 is arranged between the first inverter section 61 and a battery 50. The first relay 51 is arranged corresponding to the first inverter section 61. The control unit 10 controls the first relay 51 to interrupt the power supply to the first inverter section 61.

As shown in FIG. 3, the second inverter section 62 is provided by a three-phase inverter, similar to the first inverter section 61. The three-phase inverter configuring the second inverter section 62 includes six switching elements 621 to 626 connected in a bridge circuit structure. The six switching elements 621 to 626 switch a power supply to the U2 coil 821, the V2 coil 822 and the W2 coil 823 included in the second winding set 82 of the electric motor 80. The second relay 52 is arranged between the second inverter section 62 and the battery 50. The second relay 52 is arranged corresponding to the second inverter section 62. The control unit 10 controls the second relay 52 to interrupt the power supply to the second inverter section 62.

In the present embodiment, the switching elements 611 to 616 and 621 to 626 are provided by metal oxide semiconductor field-effect transistors (MOSFET). The MOSFET is one type of the field-effect transistor. The first relay 51 and the second relay 52 are also provided by the MOSFETs. Hereinafter, the switching elements 611 to 616 and 621 to 626 are also referred to as MOS 611 to 616 and 621 to 626.

A drain of the MOS 611 included in the first inverter section 61 is coupled to one end of the battery 50 having a high potential. Hereinafter, the end of the battery 50 having the high potential is also referred to as a high-potential end. A source of the MOS 611 is coupled to a drain of the MOS 614. A source of the MOS 614 is coupled to the ground via the shunt resistor 751. A coupling point between the source of the MOS 611 and the drain of the MOS 614 is also coupled to an end of the U1 coil 811. A drain of the MOS 612 included in the first inverter section 61 is coupled to the high-potential end of the battery 50, and a source of the MOS 612 is coupled to a drain of the MOS 615. A source of the MOS 615 is coupled to the ground via the shunt resistor 752. A coupling point between the source of the MOS 612 and the drain of the MOS 615 is also coupled to an end of the V1 coil 812. A drain of the MOS 613 included in the first inverter section 61 is coupled to the high-potential end of the battery 50, and a source of the MOS 613 is coupled to a drain of the MOS 616. A source of the MOS 616 is coupled to the ground via the shunt resistor 753. A coupling point between the source of the MOS 613 and the drain of the MOS 616 is also coupled to an end of the W1 coil 813.

A drain of the MOS 621 included in the second inverter section 62 is coupled to the high-potential end of the battery 50, and a source of the MOS 621 is coupled to a drain of the MOS 624. A source of the MOS 624 is coupled to the ground via the shunt resistor 754. A coupling point between the source of the MOS 621 and the drain of the MOS 624 is also coupled to an end of the U2 coil 821. A drain of the MOS 622 included in the second inverter section 62 is coupled to the high-potential end of the battery 50, and a source of the MOS 622 is coupled to a drain of the MOS 625. A source of the MOS 625 is coupled to the ground via the shunt resistor 755. A coupling point between the source of the MOS 622 and the drain of the MOS 625 is also coupled to an end of the V2 coil 822. A drain of the MOS 623 included in the second inverter section 62 is coupled to the high-potential end of the battery 50, and a source of the MOS 622 is coupled to a drain of the MOS 626. A source of the MOS 626 is coupled to the ground via the shunt resistor 756. A coupling point between the source of the MOS 623 and the drain of the MOS 626 is also coupled to an end of the W2 coil 823.

The control unit 10 obtains a U1 current Iu1 in the U1 coil 811, a V1 current Iv1 in the V1 coil 812 and a W1 current Iw1 in the W1 coil 813 based on the respective voltages of the shunt resistors 751, 752, 753. Herein, the voltage of the shunt resistor indicates a voltage difference between two ends of the shunt resistor. The control unit 10 obtains a U2 current Iu2 in the U2 coil 821, a V2 current Iv2 in the V2 coil 822 and a W2 current Iw2 in the W2 coil 823 based on the respective voltages of the shunt resistors 754, 755, 756. In the present embodiment, since the U1 current Iu1, the V1 current Iv1, the W1 current Iw1, the U2 current Iu2, the V2 current Iv2, and the W2 current Iw2 flow through the winding sets, the U1 current Iu1, the V1 current Iv1, the W1 current Iw1, the U2 current Iu2, the V2 current Iv2, and the W2 current Iw2 are also referred to as winding currents.

The control unit 10 controls the first inverter section 61 based on the steering torque Tq detected by the torque sensor 94, the speed SP of the vehicle detected by the speed sensor 95, the rotation angle θ detected by the rotation angle sensor 85, and the winding currents Iu1, Iv1, Iw1 detected by the first current detector 75a.

Specifically, the control unit 10 performs the following process. The control unit 10 performs a dq transformation to the U1 current Iu1, the V1 current Iv1 and the W1 current Iw1 based on the rotation angle θ, and obtains a d-axis current Id and a q-axis current Iq. Further, the control unit 10 calculates a current command value based on the steering torque Tq and the speed SP of the vehicle. Then, the control unit 10 obtains a d-axis current command value Idt and a q-axis current command value Iqt based on the current command value and the rotation angle θ. The control unit 10 calculates a d-axis voltage command value Vdt and a q-axis voltage command value Vqt by performing a current feedback calculation based on the d-axis current command value Idt, the q-axis current command value Iqt, the d-axis current Id, and the q-axis current Iq. Specifically, the control unit 10 calculates a d-axis current difference ΔId between the d-axis current command value Idt and the d-axis current Id, and calculates a q-axis current difference ΔIq between the q-axis current command value Iqt and the q-axis current Iq. Then, the control unit 10 calculates the d-axis voltage command value Vdt and the q-axis voltage command value Vqt so that the d-axis current difference ΔId and the q-axis current difference ΔIq converge to zero. That is, the control unit 10 calculates the d-axis voltage command value Vdt and the q-axis voltage command value Vqt so that the d-axis current Id and the q-axis current Iq converge to the d-axis current command value Idt and the q-axis current command value Iqt, respectively. Then, the control unit 10 converts, based on the rotation angle θ, the d-axis voltage command value Vdt and the q-axis voltage command value Vqt to three voltage command values Vu1, Vv1, Vw1 corresponding to the three phases of the electric motor 80. The control unit 10 controls the turning on/turning off of the MOS 611 to 616 included in the first inverter section 61 based on the calculated voltage command values Vu1, Vv1, Vw1. With this configuration, an alternating-current power is generated in the first inverter section 61, and the alternating-current power is provided to the first winding set 81 in order to drive the electric motor 80. Similar to the first inverter section 61, an alternating-current power is generated in the second inverter section 62, and the alternating-current power is provided to the second winding set 82 in order to drive the electric motor 80.

In the present embodiment, when the electric motor 80 operates properly, the electric motor 80 is driven by both the first system 100 and the second system 200 in order to assist the driver to steer the steering wheel 91. Further, when a fault occurs in the first system 100 or in the second system 200, the control unit 10 drives the electric motor 80 with a properly operating system, which is one of the first and the second systems 100, 200, to assist the driver to steer the steering wheel 91. At the same time, the control unit 10 performs a process to add a vibration to the steering wheel 91, more specifically the steering torque Tq, in order to notify the fault occurred in one of the systems 100, 200 to the driver. Hereinafter, the process to add a vibration to the steering wheel 91 is also referred to as a vibrating process.

Figure 4:
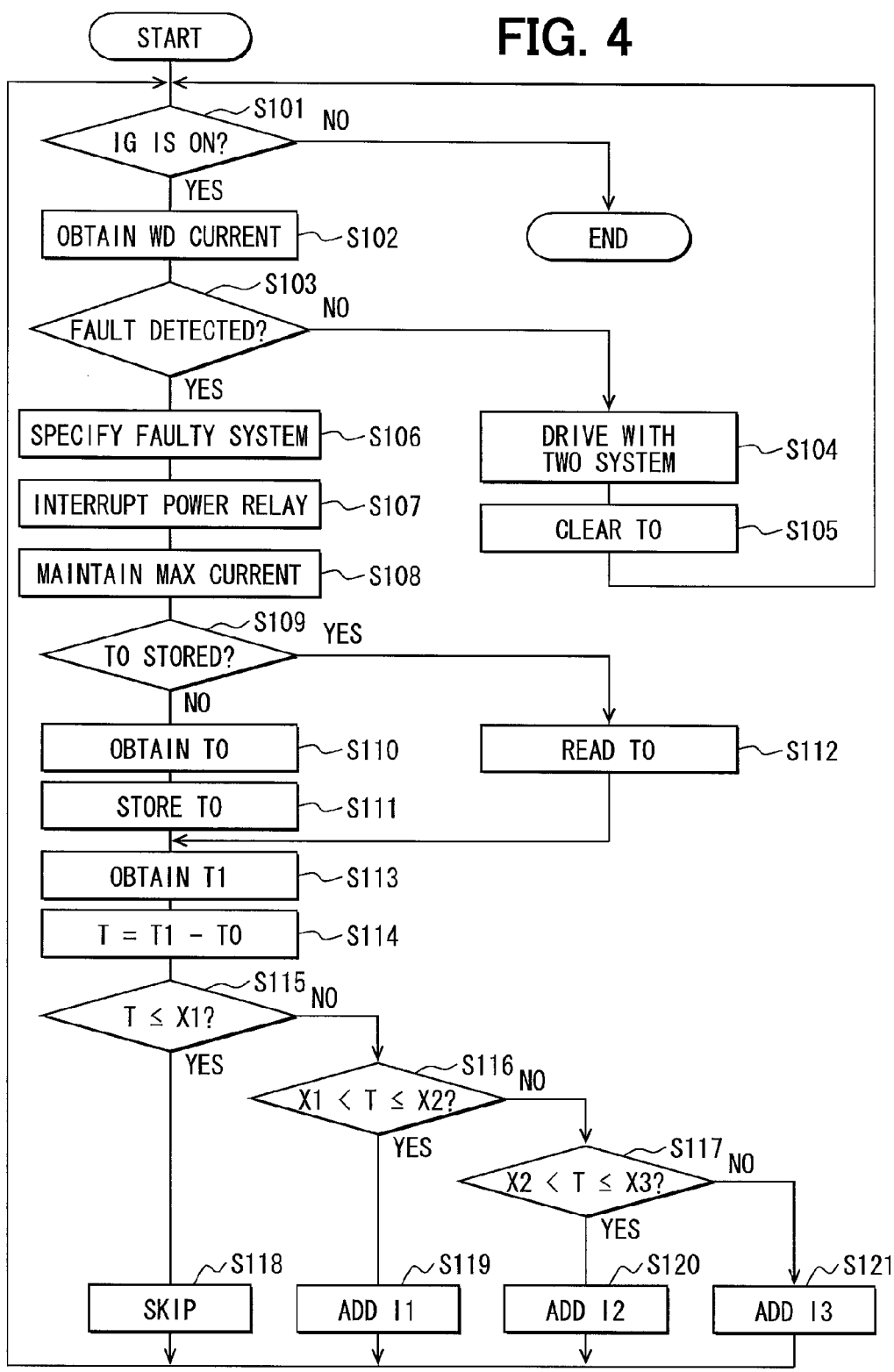
FIG. 4 is a flowchart showing a vibrating process according to the first embodiment.

The following will describe the vibrating process executed by the control unit 10 with reference to FIG. 4. At S101, the control unit 10 determines whether the ignition switch 33 of the vehicle is turned on. When the control unit 10 determines that the ignition switch 33 is not turned on (S101: NO), the control unit 10 ends the vibrating process. When the control unit 10 determines that the ignition switch 33 is turned on (S101: YES), the control unit 10 proceeds to S102. At S102, the control unit 10 detects the voltages of the shunt resistors 751 to 756, and obtains the winding currents Iu1, Iv1, Iw1, Iu2, Iv2, Iw2.

At S103, the control unit 10 determines whether a fault is occurred in one of the first inverter section 61, the first winding set 81, the second inverter section 62, and the second winding set 82 based on the winding currents Iu1, Iv1, Iw1, Iu2, Iv2, Iw2. When the control unit 10 determines that a fault is occurred in one of the first inverter section 61, the first winding set 81, the second inverter section 62, or the second winding set 82 (S103: YES), the control unit 10 proceeds to S106. When the control unit 10 determines that no fault is occurred in the first inverter section 61, the first winding set 81, the second inverter section 62, and the second winding set 82 (S103: NO), the control unit 10 proceeds to S104.

At S104, the control unit 10 continues to drive the electric motor 80 with the first system 100 and the second system 200. At S105, the control unit 10 clears fault detection time information stored in the storage unit 11, and returns to S101. The fault detection time information is information related to a time T0 at when the fault is detected.

At S106, the control unit 10 specifies one of the two systems 100, 200 in which the fault is occurred based on the winding currents obtained at S102. At S107, the control unit 10 interrupts the relay of the system in which the fault is occurred. For example, when the fault is occurred in the first inverter section 61 or the first winding set of the first system 100, the control unit 10 interrupts the first relay 51. Hereinafter, a system in which the fault is occurred is also referred to as a faulty system, and a system in which the fault is not occurred is also referred to as a properly-operating system.

At S108, the control unit 10 sets a maximum current to be supplied to the properly-operating system. In the present embodiment, a maximum current of the properly-operating system after an occurrence of the fault in the faulty system is set the same with a maximum current Ir before the occurrence of the fault in the faulty system. In the present embodiment, before the occurrence of the fault, the maximum current Ir in the first system 100 is set the same with the maximum current Ir in the second system 200. Thus, when both systems 100, 200 operate properly, a sum of the maximum currents It to drive the electric motor 80 is twice of the maximum current Ir (It=2Ir) of the properly-operating system. When the fault occurs in one of the systems 100, 200, the faulty system stops supplying the current to the electric motor 80. In this case, the properly-operating system maintains the maximum current Ir, and supplies the maximum current Ir to the electric motor 80. That is, the sum of the maximum currents It to drive the electric motor 80 is equal to the maximum current Ir, which is a half of the sum of the maximum currents It in a case where both systems 100, 200 operate properly. When the sum of the maximum currents It to drive the electric motor 80 reduces by half, the assistance torque output from the electric motor 80 reduces. Thus, the driver senses reduction in assistance torque during steering the steering wheel 91. Further, the maximum current Ir in the properly-operating system is maintained regardless of the occurrence of the fault in another system. Thus, heat generated in the inverter section caused by an overload is restricted. Usually, the inverter included in the inverter section is provided by a high-performance inverter in order to be tolerant of the generated heat caused by the overload. Thus, with the configuration according to the present embodiment, there is no need to use the high-performance inverter in the inverter section.

At S109, the control unit 10 determines whether the fault detection time information is stored in the storage unit 11. Herein, the fault detection time information is related to the time T0 at when the fault is detected. Hereinafter, the time T0 at when the fault is detected is also referred to as a fault detection time T0. When the control unit 10 determines that the fault detection time is stored in the storage unit 11 (S109: YES), the control unit 10 proceeds to S112. When the control unit 10 determines that the fault detection time is not stored in the storage unit 11 (S109: NO), the control unit 10 proceeds to S110.

At S110, the control unit 10 obtains time information from the body ECU 31 or the navigation ECU 32 via a communication network, such as the CAN, and sets the present time as the fault detection time T0. At S111, the control unit 10 stores the fault detection time information related to the fault detection time T0 in the storage unit 11. At S112, the control unit 10 reads the fault detection time information related to the fault detection time T0 from the storage unit 11.

At S113, the control unit 10 obtains present time information related to the present time T1 from the body ECU 31 or the navigation ECU 32 via the communication network, such as the CAN. At S114, the control unit 10 calculates an elapsed time T from the occurrence of the fault based on the present time information and the fault detection time information. Hereinafter, the elapsed time from the occurrence of the fault is also referred to as the elapsed time T. Specifically, the control unit 10 subtracts the fault detection time T0 from the present time T1 in order to calculate the elapsed time T. That is, the elapsed time T, the present time T1 and the fault detection time T0 satisfy a relationship T=T1−T0.

At S115, the control unit 10 determines whether the elapsed time T is equal to or smaller than a threshold time. The threshold time is also referred to as a first threshold time X1. When the control unit 10 determines that the elapsed time T is equal to or smaller than the first threshold time X1 (S115: YES), the control unit 10 proceeds to S118. When the control unit 10 determines that the elapsed time T is larger than the first threshold time X1 (S115: NO), the control unit 10 proceeds to S116. At S116, the control unit 10 further determines whether the elapsed time T is larger than the first threshold time X1 and equal to or smaller than a second threshold time X2. Herein, the second threshold time X2 is twice of the first threshold time X1. When the control unit 10 determines that the elapsed time T is larger than the first threshold time X1 and equal to or smaller than the second threshold time X2 (S116: YES), the control unit 10 proceeds to S119. When the control unit 10 determines that the elapsed time T is larger than the second threshold time X2 (S116: NO), the control unit 10 proceeds to S117. At S117, the control unit 10 further determines whether the elapsed time T is larger than the second threshold time X2 and equal to or smaller than a third threshold time X3. Herein, the third threshold time X3 is thrice of the first threshold time X1. When the control unit 10 determines that the elapsed time T is larger than the second threshold time X2 and equal to or smaller than the third threshold time X3 (S117: YES), the control unit 10 proceeds to S120. When the control unit 10 determines that the elapsed time T is larger than the third threshold time X3 (S117: NO), the control unit 10 proceeds to S121.

At S118, the control unit 10 skips adding the vibration to the steering torque Tq, and end the vibrating process. At S119, the control unit 10 adds a vibrating current I1 to the current command value. The vibrating current I1 generates a vibration in the output torque from the electric motor 80 so that a vibration having an amplitude of V1 is added to the steering torque Tq. Then, the control unit 10 returns to S101. At S120, the control unit 10 adds a vibrating current I2 to the current command value. The vibrating current I2 generates a vibration in the output torque from the electric motor 80 so that a vibration having an amplitude of V2 is added to the steering torque Tq. Then, the control unit 10 returns to S101. At S121, the control unit 10 adds a vibrating current I3 to the current command value. The vibrating current I3 generates a vibration in the output torque from the electric motor 80 so that a vibration having an amplitude of V3 is added to the steering torque Tq. Then, the control unit 10 returns to S101.

In the present embodiment, after the detection of the fault, the control unit 10 adds the vibrating currents I1 to I3 to the current command value so that the output torque from the electric motor 80 vibrates with the stepwisely increasing amplitudes. Accordingly, the steering torque Tq vibrates with the stepwisely increasing amplitudes V1 to V3. The vibrating current I1 is set such that the vibration to be added to the steering torque Tq has the amplitude of V1. The vibrating current I2 is set larger than the vibrating current I1 such that the vibration to be added to the steering torque Tq has the amplitude of V2, which is larger than the amplitude of V1. The vibrating current I3 is set larger than the vibrating current I2 such that the vibration to be added to the steering torque Tq has the amplitude of V3, which is larger than the amplitude of V2. That is, the vibrating currents I1 to I3 and the amplitudes V1 to V3 of the vibration satisfy the relationship of I1<I2<I3 and V1<V2<V3. With this configuration, the amplitude of the vibration added to the steering torque Tq gradually increases over time after the detection of the fault.

The amplitudes V1 to V3 of the vibration added to the steering torque Tq are set appropriately so that the driver is notified of the vibrations and the steering of the steering wheel 91 is not disturbed by the vibration. For example, in the present embodiment, the amplitude of V3 is set to 0.5 Newton meter (N·m) so that the steering of the steering wheel 91 is not disturbed by the vibration. The amplitudes of V1 and V2 are set appropriately smaller than the V3. Usually, when the driver operates the steering wheel 91, a vibration frequency of the steering wheel 91 is within a range of 0 to 2 hertz (Hz). A vibration frequency of the vibration added to the steering torque Tq is set substantially larger than the vibration frequency of the steering wheel 91 in a normal operation state. For example, the frequency of the vibration added to the steering torque Tq may be set as 20 Hz. Further, in the present embodiment, the amplitude of the vibration output from the electric motor 80 and added to the steering torque Tq are referred to as a vibration component. The vibration component causes the steering torque to vibrate with the stepwisely increasing amplitude from V1 to V3.

Further, the elapsed time T may have a maximum value, although is not shown in FIG. 4. The maximum value of the elapsed time T may be set as a predetermined period, which is a mandatory motor-vehicle inspection period set forth by law in a country. For example, in Japan, the maximum value of the elapsed time T may be set as one year, which is the mandatory motor-vehicle inspection period set forth by law in Japan.

The following will describe the current command value Ic and the steering torque Tq when the vibrating process is executed with reference to FIG. 5A and FIG. 5B. As shown in FIG. 5A, when the steering wheel 91 is rotated in the clockwise direction, the torque applied to the steering wheel 91 is defined to have a positive value. Further, when the steering wheel 91 is rotated in the counterclockwise direction, the torque applied to the steering wheel 91 is defined to have negative value. The following will describe an exemplary case in which the fault occurs in the first inverter section 61 or in the first winding set 81 of the first system 100. That is, the first system 100 is the faulty system, and the second system is the properly-operating system.

When the control unit 10 determines that the fault occurs in the first system 100 and specifies the faulty system (S103: YES, S106), the control unit 10 controls the first relay 51 to interrupt the power supply (S107). Then, the control unit 10 drives the electric power steering apparatus 1 with the second system 200. In the present embodiment, the maximum current of the second system 200 after the occurrence of the fault in the first system 100 is the same with the maximum current of the second system 200 before the occurrence of the fault (S108). Thus, the power to drive the electric motor 80 is approximately reduced by half causing a reduction in assistance torque output from the electric motor 80. When the assistance torque reduces, the driver may sense a change in the steering of the steering wheel 91. Further, the control unit 10 obtains the fault detection time information and the present time information (S109 to S113), and calculates the elapsed time T from the detection of the fault to the present time (S114).

When the elapsed time T from the fault detection time (FDT) T0 to the present time is equal to or smaller than the first threshold time X1 (S115: YES), the control unit 10 skips adding the vibration to the steering torque Tq. When the first threshold time X1 is set to zero, the vibrating process starts right after the control unit 10 detects the fault. When the elapsed time T is larger than the first threshold time X1 and equal to or smaller than the second threshold time X2 (S116: YES), the vibrating current I1 is added to the current command value (S119) and the vibration having the amplitude of V1 is added to the steering torque Tq. Thus, the steering wheel 91 vibrates caused by the vibration added to the steering torque Tq.

When the elapsed time T is larger than the second threshold time X2 and equal to or smaller than the third threshold time X3 (S117: YES), the vibrating current I2 is added to the current command value (S120) and the vibration having the amplitude of V2 is added to the steering torque Tq. Thus, the steering wheel 91 vibrates caused by the vibration added to the steering torque Tq. The amplitude of V2 is larger than the amplitude of V1, thus, the vibration is more easily felt by the driver compared with a case in which the elapsed time T is equal to or smaller than the second threshold time X2.

When the elapsed time T is larger than the third threshold time X3 (S117: NO), the vibrating current I3 is added to the current command value (S121) and the vibration having the amplitude of V3 is added to the steering torque Tq. Thus, the steering wheel 91 vibrates caused by the vibration added to the steering torque Tq. The amplitude of V3 is larger than the amplitude of V2, thus, the vibration is more easily felt by the driver compared with a case in which the elapsed time T is equal to or smaller than the third threshold time X3. In the present embodiment, as shown in FIGS. 5A and 5B, the vibrating currents I1 to I3 are superimposed to the current command value and the vibration components are superimposed to the steering torque Tq.

As described above, the electric motor drive apparatus 2 according to the present embodiment drives the electric motor 80, which has the first winding set 81 and the second winding set 82, to assist the steering of the steering wheel 91. The electric motor drive apparatus 2 further includes inverter sections 61, 62, relays 51, 52 and the control unit 10. The inverter sections 61, 62 are arranged corresponding to the respective winding sets 81, 82. The relays 51, 52 are arranged corresponding to the respective inverter sections 61, 62. The relays 51, 52 interrupt the power supply to the respective inverter sections 61, 62. The control unit 10 performs the drive control to the first inverter section 61, the second inverter section 62 and the relays 51, 52.

The control unit 10 performs the following process. The control unit 10 obtains the winding currents Iu1, Iv1, Iw1 flowing through the first inverter section 61 and the first winding set 81, and obtains the winding currents Iu2, Iv2, Iw2 flowing through the second inverter section 62 and the second winding set 82 (S102). The control unit 10 determines whether the fault is occurred in the first inverter section 61, the first winding set 81, the second inverter section 62, or the second winding set 82 based on the winding currents Iu1, Iv1, Iw1, Iu2, Iv2, Iw2 (S103). For example, when the control unit 10 determines that the fault is occurred in the first inverter section 61 or in the first winding set 81 of the first system 100 (S103: YES), the control unit 10 specifies the first system 100 as the faulty system (S106), and controls the first relay 51 to interrupt the power supply to the first inverter section 61 of the first system (S107). Further, when the control unit 10 determines that the fault is occurred in the first system 100, the control unit 10 controls the second inverter section 62 of the second system 82, which is the properly-operating system, to add the vibration to the output torque from the electric motor 80. In the present embodiment, the vibration is added to the output torque from the electric motor 80 so that the output torque vibrates with the amplitude, which increases over time in a stepwise manner. Accordingly, the steering torque vibrates with an amplitude, which increases from V1 to V3 over time in a stepwise manner (S118 to S121).

With above-described configuration, the control unit 10 drives the electric motor 80 with the second system 200, and appropriately notifies of the fault occurred in the first system 100 to the driver. In the present embodiment, the electric motor drive apparatus 2 is applied to the electric power steering apparatus 1. The amplitude of the vibration added to the steering torque Tq increases in a stepwise manner from V1 to V3 over time corresponding to the vibration added to the output torque from the electric motor 80. Thus, the fault occurred in the electric power steering apparatus 1 is perceived by the driver as the vibration, which is purposely added to the steering torque Tq, and the fault is notified to the driver regardless of individual variation. Thus, the driver is motivated to bring the vehicle to an automobile repair shop or factory at an early time. Accordingly, a case in which a fault occurs in the last properly-operating system causing a total failure in steering assist is avoided. Further, the vibration added by the vibrating process is set appropriately so that the steering of the steering wheel 91 is not disturbed by the vibration. For example, when the driver drives the vehicle to the automobile repair shop or factory, the properly-operating system, in this case is the second system 200, continues to assist the steering of the steering wheel 91. That is, the fault occurred in one of the systems is appropriately notified to the driver with a maintaining of a steering assist to the driver. In the present embodiment, when the fault occurs in one system, the assist torque is approximately reduced by half compared with a case in which both two systems operate properly.

Specifically, the control unit 10 adds the vibrating currents I1 to I3 to the current command values, which drive the second inverter section 62 of the second system 200, in order to add the vibration to the output torque from the electric motor 80. The vibration added to the output torque from the electric motor 80 causes the steering torque Tq vibrates with the stepwisely increasing amplitude from V1 to V3. Thus, the vibrating process is executed appropriately.

Further, in the present embodiment, the amplitude V1 to V3 of the vibration added to the steering torque Tq is set based on the elapsed time T from the detection of the fault. Thus, after the fault occurs in the first system 100, the amplitude of the vibration increases stepwisely from V1 to V3 over time. That is, the amplitude of the vibration increases over time. Thus, the fault occurred in the electric power steering apparatus 1 is easily perceived by the driver. Further, the notifying of the fault in the second system 200 to the driver is performed in a similar way to the case in which the fault occurs in the first system 100.

In the present embodiment, the control unit 10 functions as an obtaining section that obtains the winding currents, a determination section that determines the occurrence of the fault, a specifying section that specifies the faulty system, an interrupting section that interrupts the power supply to the faulty system, and a vibrating section that adds the vibration to the steering torque Tq. Specifically, the process executed at S102 in FIG. 4 functions as the obtaining section. The process executed at S103 functions as the determination section. The process executed at S106 functions as the specifying section. The process executed at S107 functions as the interrupting section. The processes executed at S119 to S121 function as the vibrating section.

Second Embodiment

Figure 6:
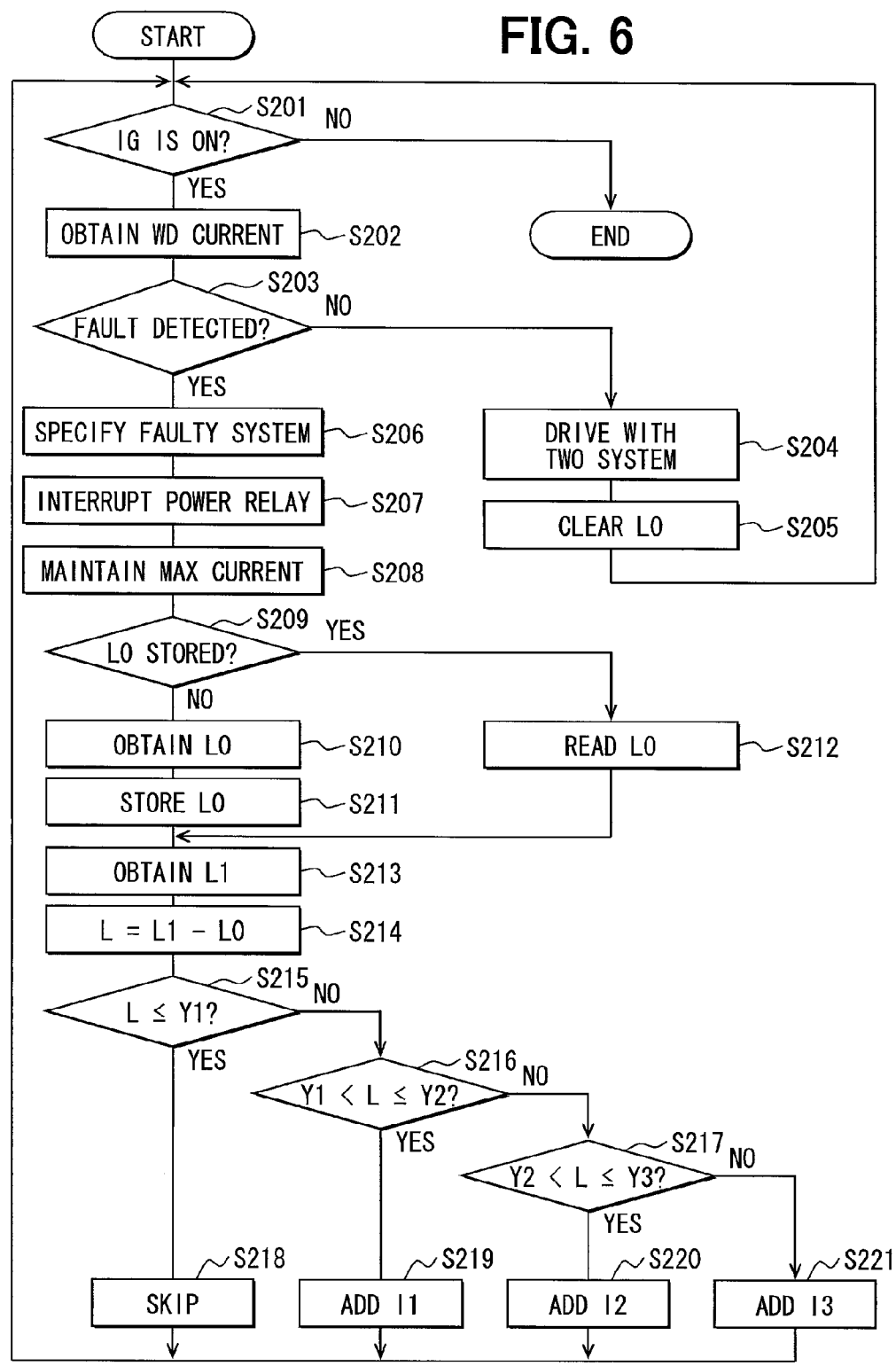
FIG. 6 is a flowchart showing a vibrating process according to a second embodiment of the present disclosure.

The following will describe a vibrating process according to a second embodiment of the present disclosure with reference to FIG. 6. In the present embodiment, only the vibrating process is different from the first embodiment. As shown in FIG. 6, the processes executed at S201 to S204 are similar to the processes executed at S101 to S104 of FIG. 4. At S205, the control unit 10 clears travel distance information, which is stored in the storage unit 11 and is related to a travel distance L0 at the fault detection time, and returns to S201. The processes executed at S206 to S208 are similar to the processes executed at S106 to S108 of FIG. 4.

At S209, the control unit 10 determines whether the travel distance information, which is related to the travel distance L0 at the fault detection time, is stored in the storage unit 11. When the control unit 10 determines that the travel distance information is stored in the storage unit 11 (S209: YES) at the fault detection time, the control unit 10 proceeds to S212. When the control unit 10 determines that the travel distance information is not stored in the storage unit 11 (S209: NO) at the fault detection time, the control unit 10 proceeds to S210.

At S210, the control unit 10 obtains the travel distance information from the body ECU 31, which controls the meters, via the communication network, such as the CAN. Then, the control unit 10 sets the obtained travel distance of the vehicle as the travel distance L0 at the fault detection time. At S211, the control unit 10 stores information related to the travel distance L0 at the fault detection in the storage unit 11. At S212, the control unit 10 reads the travel distance information at the fault detection time, which is related to the travel distance L0 at the fault detection time, from the storage unit 11.

At S213, the control unit 10 obtains present travel distance information related to a present travel distance L1 from the body ECU 31 via the communication network, such as the CAN. At S214, the control unit 10 calculates a travel distance L after the occurrence of the fault based on the present travel distance information and the travel distance information at the fault detection time. Specifically, the control unit 10 subtracts the travel distance L0 at the fault detection time from the present travel distance L1 in order to obtain the travel distance L after the occurrence of the fault. That is, travel distance L0 at the fault detection time, the present travel distance L1 and the travel distance L after the occurrence of the fault satisfy a relationship L=L1−L0.

At S215, the control unit 10 determines whether the travel distance L after the occurrence of the fault is equal to or smaller than a first threshold distance Y1. When the control unit 10 determines that the travel distance L after the occurrence of the fault is equal to or smaller than the first threshold distance Y1 (S215: YES), the control unit 10 proceeds to S218. When the control unit 10 determines that the travel distance L after the occurrence of the fault is larger than the first threshold distance Y1 (S215: NO), the control unit 10 proceeds to S216. At S216, the control unit 10 further determines whether the travel distance L after the occurrence of the fault is larger than the first threshold distance Y1 and equal to or smaller than a second threshold distance Y2. When the control unit 10 determines that the travel distance L after the occurrence of the fault is larger than the first threshold distance Y1 and equal to or smaller than the second threshold distance Y2 (S216: YES), the control unit 10 proceeds to S219. When the control unit 10 determines that the travel distance L after the occurrence of the fault is larger than the second threshold distance Y2 (S216: NO), the control unit 10 proceeds to S217. At S217, the control unit 10 further determines whether the travel distance L after the occurrence of the fault is larger than the second threshold distance Y2 and equal to or smaller than a third threshold distance Y3. When the control unit 10 determines that the travel distance L after the occurrence of the fault is larger than the second threshold distance Y2 and equal to or smaller than the third threshold distance Y3 (S217: YES), the control unit 10 proceeds to S220. When the control unit 10 determines that the travel distance L after the occurrence of the fault is larger than the third threshold distance Y3 (S217: NO), the control unit 10 proceeds to S221.

At S218, the control unit 10 skips adding the vibration to the steering torque Tq, and returns to S201. At S219, the control unit 10 adds a vibrating current I1 to the current command value. The vibrating current I1 generates a vibration in the output torque from the electric motor 80 so that a vibration having an amplitude of V1 is added to the steering torque Tq. Then, the control unit 10 returns to S201. At S220, the control unit 10 adds a vibrating current I2 to the current command value. The vibrating current I2 generates a vibration in the output torque from the electric motor 80 so that a vibration having an amplitude of V2 is added to the steering torque Tq. Then, the control unit 10 returns to S201. At S221, the control unit 10 adds a vibrating current I3 to the current command value. The vibrating current I3 generates a vibration in the output torque from the electric motor 80 so that a vibration having an amplitude of V3 is added to the steering torque Tq. Then, the control unit 10 returns to S201.

Further, the travel distance L after the occurrence of the fault may have a maximum value, although is not shown in FIG. 6. The maximum value of the travel distance L after the occurrence of the fault may be set as a predetermined distance, which is an average travel distance run by the drivers within a country. For example, in Japan, the maximum value of the travel distance L after the occurrence of the fault may be set to 10000 kilometers or smaller. Further, the first threshold distance Y1 may be set to zero so that the vibrating process starts right after the control unit 10 determines the occurrence of the fault.

The following will describe advantages provided by the electric motor drive apparatus 2 according to the present embodiment. In the present embodiment, the amplitude of the vibration added to the steering torque Tq is set corresponding to the travel distance L after the occurrence of the fault. Thus, after the fault occurs in the first system 100, the amplitude of the vibration increases stepwisely from V1 to V3 with an increase of the travel distance L after the occurrence of the fault. That is, the amplitude of the vibration increases with the increase of the travel distance L after the occurrence of the fault. Thus, the fault occurred in the electric power steering apparatus 1 is easily perceived by the driver. Further, in the present embodiment, the notifying of the fault occurred in the second system 200 is performed in a similar way to the case in which the fault occurs in the first system 100.

In the present embodiment, the process executed at S202 in FIG. 6 functions as the obtaining section. The process executed at S203 functions as the determination section. The process executed at S206 functions as the specifying section. The process executed at S207 functions as the interrupting section. The processes executed at S219 to S221 function as the vibrating section.

Third Embodiment

In the foregoing embodiments, the control unit 10 obtains the information related to the time and the information related to the travel distance via the communication section, such as the CAN. In the present embodiment, the control unit 10 executes the vibrating process without using the communication network. In the present embodiment, the control unit 10 is capable of executing the vibrating process even when the control unit 10 fails to obtain the information related to the time and the information related to the travel distance.

Figure 7:
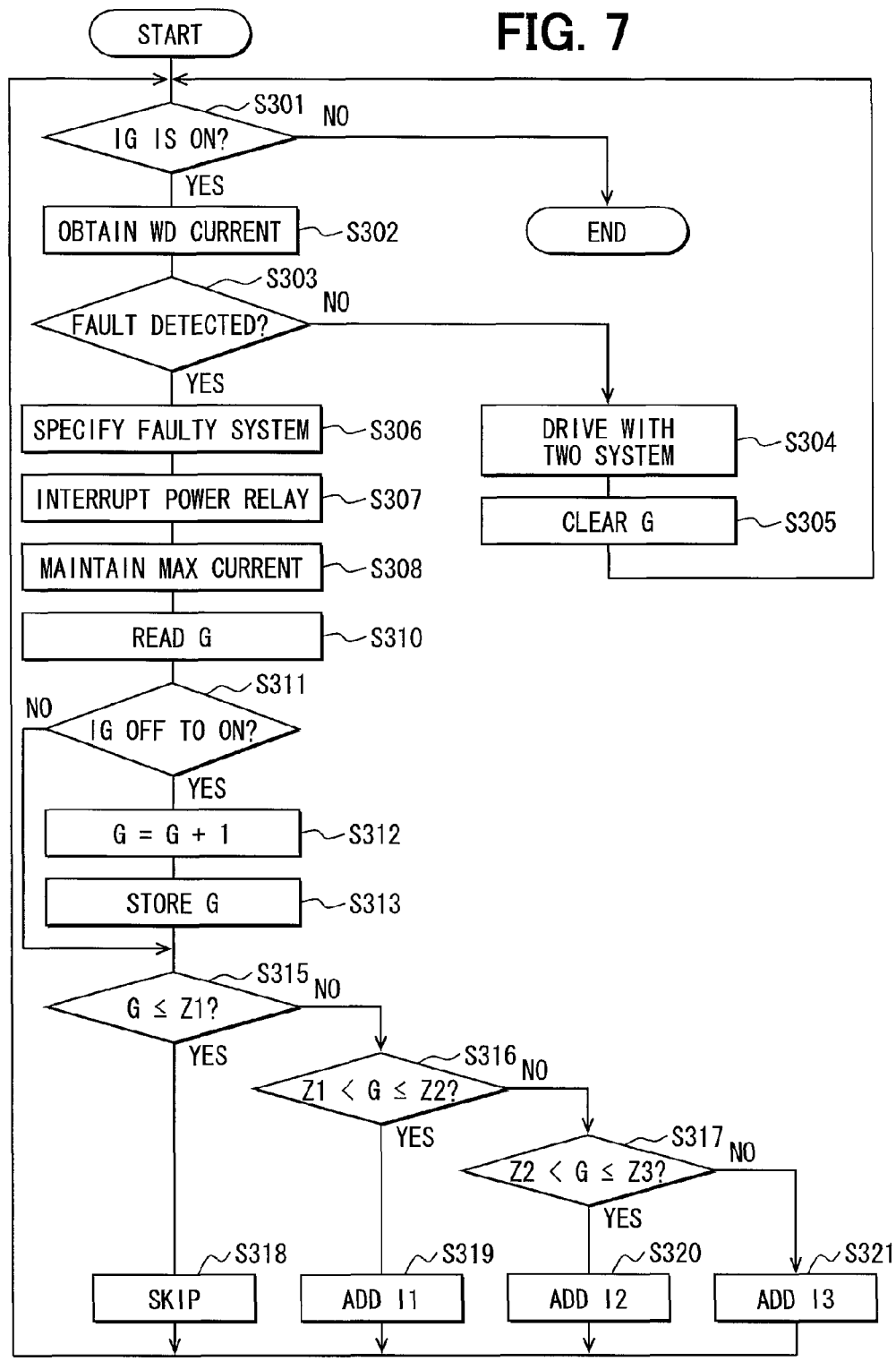
FIG. 7 is a flowchart showing a vibrating process according to a third embodiment of the present disclosure.

The following will describe a vibrating process according to the third embodiment of the present disclosure with reference to FIG. 7. In the present embodiment, the configurations of the electric power steering apparatus 1 and the electric motor drive apparatus 2 will be omitted. As shown in FIG. 7, at S301, the control unit 10 determines whether the ignition switch 33 is turned on from an off state. When the control unit 10 determines that the ignition switch 33 maintains in the off state (S301: NO), the control unit 10 ends the vibrating process. At S301, the control unit 10 further sets an ignition switch off flag (IG off flag) to one when the IG off flag does not have a value of one. The IG off flag is a flag that detects whether the ignition switch 33 is turned off from an on state. When the ignition switch 33 is turned off from the on state, the IG off flag is set to one. When the control unit 10 determines that the ignition switch 33 is turned on from the off state (S301: YES), the control unit 10 proceeds to S302.

The processes executed at S302 to S304 are similar to the processes executed at S102 to S104 of FIG. 4. In the present embodiment, the number G of switching times of the ignition switch 33 from the off state to the on state after the occurrence of the fault is stored in the storage unit 11. Hereinafter, the number G of the switching times of the ignition switch 33 from the off state to the on state after the occurrence of the fault is also referred to as the number G of turn-on operations or the number G of operations. At S305, the control unit 10 clears the stored number G of turn-on operations of the ignition switch 33 after the occurrence of the fault. Further, at S305, the control unit 10 further resets the IG off flag to zero when the IG off flag has the value of one. The processes executed at S306 to S308 are similar to the processes executed at S106 to S108 of FIG. 4.

At S310, the control unit 10 reads out, from the storage unit 11, the numbers G of switching times of the ignition switch 33 from the off state to the on state after the occurrence of the fault.

At S311, the control unit 10 determines whether the ignition switch 33 is turned on from the off state. For example, the control unit 10 may determine whether the ignition switch 33 is turned on from the off state based on the IG off flag. When the control unit 10 determines that the ignition switch 33 is not turned on from the off state (S311: NO), that is the IG off flag is not set to one, the control unit 10 proceeds to S315. When the control unit 10 determines that the ignition switch 33 is turned on from the off state (S311: YES), that is the IG off flag is set to one, the control unit 10 proceeds to S312. At S312, the control unit 10 increments the number G of switching times of the ignition switch 33 from the off state to the on state after the occurrence of the fault by one. Further, the control unit 10 resets the IG off flag to zero. At S313, the control unit 10 stores the number G of switching times of the ignition switch 33 from the off state to the on state after the occurrence of the fault to the storage unit 11.

At S315, the control unit 10 determines whether the number G of switching times of the ignition switch 33 from the off state to the on state after the occurrence of the fault is equal to or less than a first threshold value Z1. When the control unit 10 determines that the number G of switching times of the ignition switch 33 from the off state to the on state after the occurrence of the fault is equal to or less than the first threshold value Z1 (S315: YES), the control unit 10 proceeds to S318. When the control unit 10 determines that the number G of switching times of the ignition switch 33 from the off state to the on state after the occurrence of the fault is larger than the first threshold value Z1 (S315: NO), the control unit 10 proceeds to S316. At S316, the control unit 10 further determines whether the number G of switching times of the ignition switch 33 from the off state to the on state after the occurrence of the fault is larger than the first threshold value Z1 and is equal to or less than a second threshold value Z2. When the control unit 10 determines that the number G of switching times of the ignition switch 33 from the off state to the on state after the occurrence of the fault is larger than the first threshold value Z1 and is equal to or less than the second threshold value Z2 (S316: YES), the control unit 10 proceeds to S319. When the control unit 10 determines that the number G of switching times of the ignition switch 33 from the off state to the on state after the occurrence of the fault is larger than second threshold value Z2 (S316: NO), the control unit 10 proceeds to S317. At S317, the control unit 10 further determines whether the number G of switching times of the ignition switch 33 from the off state to the on state after the occurrence of the fault is larger than the second threshold value Z2 and is equal to or less than a third threshold value Z3. When the control unit 10 determines that the number G of switching times of the ignition switch 33 from the off state to the on state after the occurrence of the fault is larger than the second threshold value Z2 and is equal to or less than the third threshold value Z3 (S317: YES), the control unit 10 proceeds to S320. When the control unit 10 determines that the number G of switching times of the ignition switch 33 from the off state to the on state after the occurrence of the fault is larger than third threshold value Z3 (S317: NO), the control unit 10 proceeds to S321.

At S318, the control unit 10 skips adding the vibration to the steering torque Tq, and returns to S301. At S319, the control unit 10 adds a vibrating current I1 to the current command value. The vibrating current I1 generates a vibration in the output torque from the electric motor 80 so that a vibration having an amplitude of V1 is added to the steering torque Tq. Then, the control unit 10 returns to S301. At S320, the control unit 10 adds a vibrating current I2 to the current command value. The vibrating current I2 generates a vibration in the output torque from the electric motor 80 so that a vibration having an amplitude of V2 is added to the steering torque Tq. Then, the control unit 10 returns to S301. At S321, the control unit 10 adds a vibrating current I3 to the current command value. The vibrating current I3 generates a vibration in the output torque from the electric motor 80 so that a vibration having an amplitude of V3 is added to the steering torque Tq. Then, the control unit 10 returns to S301.

Further, the number G of switching times of the ignition switch 33 from the off state to the on state after the occurrence of the fault may have a maximum value, although is not shown in FIG. 7. The maximum value of the number G of switching times of the ignition switch 33 from the off state to the on state after the occurrence of the fault may be set as a predetermined value, which is an average number of switching times of the ignition switch 33 operated by the drivers within a country. For example, in Japan, the average number of switching times of the ignition switch 33 operated by the drivers per day is 2.7. Thus, the predetermined value of the average number of switching times of the ignition switch 33 operated by the drivers within one year may be set as equal to or less than 1000. Further, the first threshold value Z1 may be set to zero.

The following will describe advantages provided by the electric motor drive apparatus 2 according to the present embodiment. In the present embodiment, the amplitude V1 to V3 of the vibration added to the steering torque Tq is set based on the number G of switching times of the ignition switch 33 from the off state to the on state after the occurrence of the fault. With this configuration, even when the informations related to the time and the travel distance of the vehicle are not available, the electric motor drive apparatus 2 is capable of executing the vibrating process based on the number G of switching times of the ignition switch 33 from the off state to the on state with a simple configuration. Further, after the fault occurs in the first system 100, the amplitude of the vibration increases stepwisely from V1 to V3 with an increase of the number G of switching times of the ignition switch 33 from the off state to the on state after the occurrence of the fault. That is, the amplitude of the vibration increases with the increase of the number G of switching times of the ignition switch 33 from the off state to the on state after the occurrence of the fault. Thus, the fault occurred in the electric power steering apparatus 1 is easily perceived by the driver. Further, in the present embodiment, the notifying of the fault in the second system 200 to the driver is performed in a similar way to the case in which the fault occurs in the first system 100.

In the present embodiment, the process executed at S302 in FIG. 7 functions as the obtaining section. The process executed at S303 functions as the determination section. The process executed at S306 functions as the specifying section. The process executed at S307 functions as the interrupting section. The processes executed at S319 to S321 function as the vibrating section.

Fourth Embodiment

The fourth embodiment is a modification of the second embodiment. In the present embodiment, the control unit 10 executes the vibrating process without the communication network. In the present embodiment, when the control unit 10 fails to obtain the information related to the travel distance from the body ECU 31 and the navigation ECU 32, the control unit 10 executes the vibrating process similar to the second embodiment based on the travel distance, which is estimated based on the speed SP of the vehicle.

Figure 8:
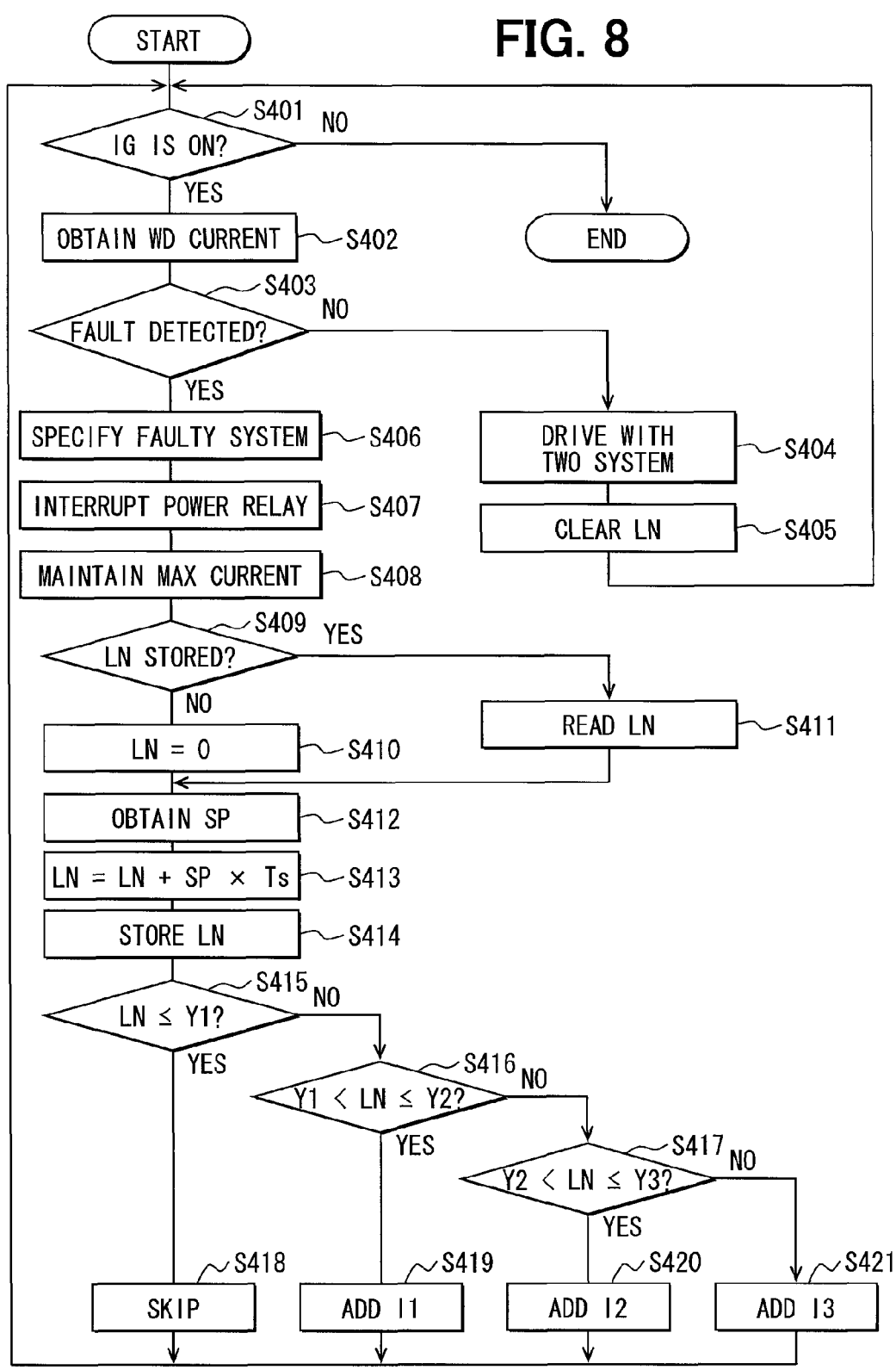
FIG. 8 is a flowchart showing a vibrating process according to a fourth embodiment of the present disclosure.

The following will describe a vibrating process according to the fourth embodiment of the present disclosure with reference to FIG. 8. As shown in FIG. 8, the processes executed at S401 to S404 are similar to the processes executed at S201 to S204 of FIG. 6. At S405, the control unit 10 clears cumulated travel distance information, which is stored in the storage unit 11 and is related to a cumulated travel distance LN at the fault detection time. The processes executed at S406 to S408 are similar to the processes executed at S206 to S208 of FIG. 6.

At S409, the control unit 10 determines whether the cumulated travel distance information, which is related to the cumulated travel distance LN at the fault detection time, is stored in the storage unit 11. When the control unit 10 determines that the cumulated travel distance information is stored in the storage unit 11 (S409: YES) at the fault detection time, the control unit 10 proceeds to S411. When the control unit 10 determines that the cumulated travel distance information is not stored in the storage unit 11 (S409: NO) at the fault detection time, the control unit 10 proceeds to S410. At S410, the control unit 10 sets the cumulated travel distance LN as zero, that is LN=0. At S411, the control unit 10 reads the cumulated travel distance information at the fault detection time, which is related to the cumulated travel distance LN at the fault detection time, from the storage unit 11.

At S412, the control unit 10 obtains the speed SP of the vehicle from the speed sensor 95. At S413, the control unit 10 calculates the cumulated travel distance after the fault detection time. First, the control unit 10 calculates a sampling elapsed time Ts from a last obtaining of the speed SP to the present time. Then, the control unit 10 adds cumulated travel distance LN at the occurrence of the fault time to a product of the obtained speed SP of the vehicle and the sampling elapsed time Ts. Specifically, the control unit 10 calculates the cumulated travel distance LN after the occurrence of the fault by an expression LN+SP×TS.

For example, suppose that the cumulated travel distance obtained at S411 is 100 kilometers (km), the speed SP of the vehicle obtained at S412 is 30 kilometers per hour (km/h), and the sampling elapsed time is 12 minutes (0.2 hour). Then, a distance from the last sampling point to the present sampling point is 6 km, which is calculated by an expression 30×0.2=6. Then, the control unit 10 adds the distance from the last sampling point to the present sampling point, which is 6 km, to the cumulated travel distance 100 km. Then, the cumulated travel distance LN to the present time is 106 km.

At S414, the control unit 10 stores the cumulated travel distance LN, which is calculated at S413, in the storage unit 11. The processes executed at S415 to S422 are similar to the processes executed at S215 to S222 of FIG. 6. In the present embodiment, the cumulated travel distance LN after the occurrence of the fault corresponds to the travel distance L after the occurrence of the fault in the second embodiment.

The electric motor drive apparatus 2 according to the present embodiment provides advantages, which are similar to the advantages provided by the second embodiment. Further, in the present embodiment, the travel distance of the vehicle is calculated based on the speed SP of the vehicle. Thus, even when the electric motor drive apparatus 2 fails to obtain the information related to the travel distance from the ECUs, the control unit 10 is capable of executing the vibrating process with a simple configuration. Further, the amplitude of the vibration increases stepwisely from V1 to V3 with an increase of the estimated cumulated travel distance LN after the occurrence of the fault. That is, the amplitude of the vibration increases with the increase of the estimated cumulated travel distance LN after the occurrence of the fault. Thus, the fault occurred in the electric power steering apparatus 1 is easily perceived by the driver.

In the present embodiment, the process executed at S402 in FIG. 8 functions as the obtaining section. The process executed at S403 functions as the determination section. The process executed at S406 functions as the specifying section. The process executed at S407 functions as the interrupting section. The processes executed at S419 to S421 function as the vibrating section.

Fifth Embodiment

Figure 9:
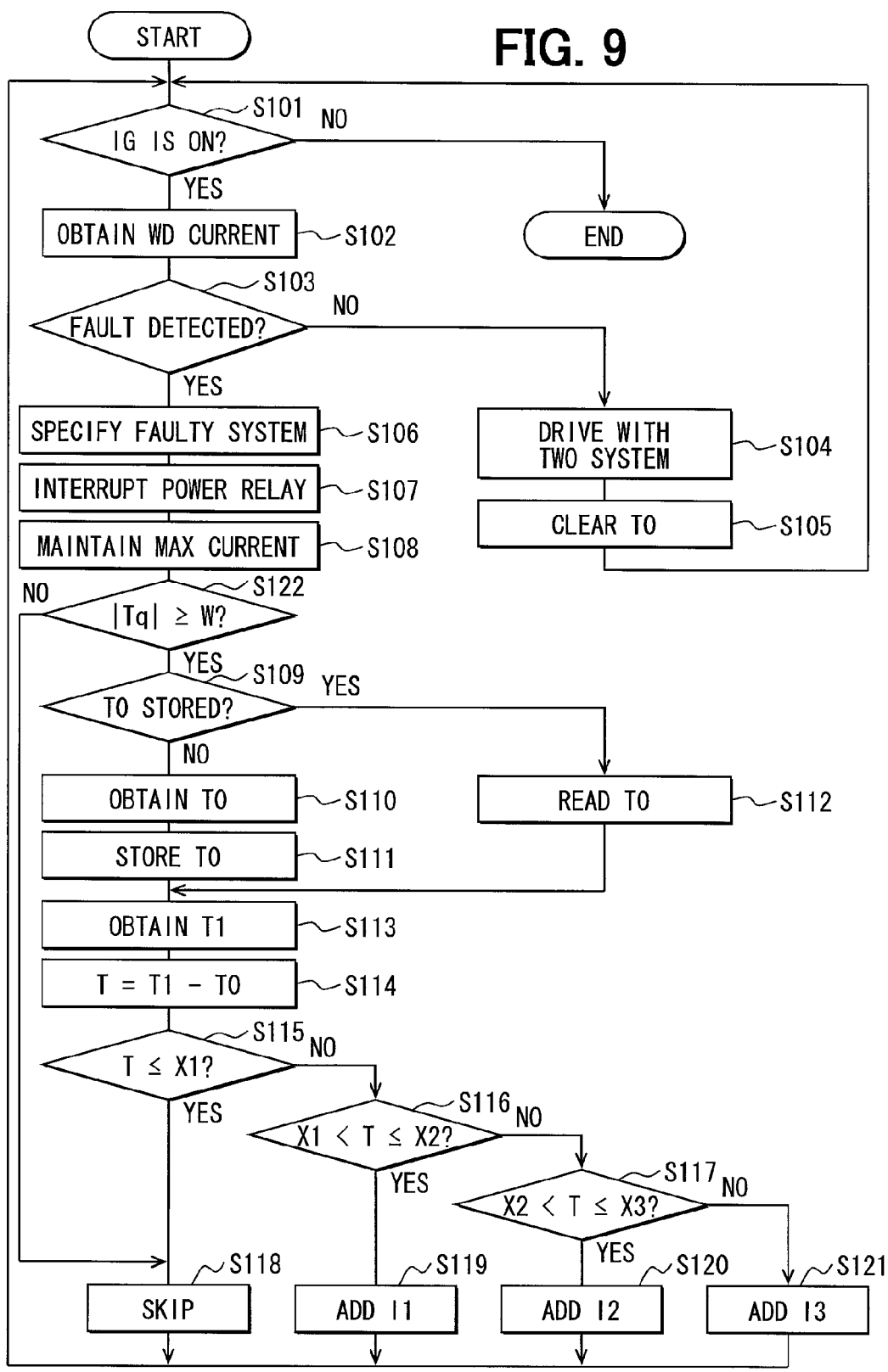
FIG. 9 is a flowchart showing a vibrating process according to a fifth embodiment of the present disclosure.

The fifth embodiment is a modification of the first embodiment. As shown in FIG. 9, the control unit 10 additionally execute S122 between S108 and S109 in the present embodiment. Since other configurations are similar to the first embodiment, the description of other configurations will be omitted. At S122, the control unit 10 determines whether an absolute value of the steering torque Tq obtained from the torque sensor 94 is equal to or larger than a predetermined value W. The predetermined value may be set as, for example, 1.5 N·m. When the control unit 10 determines that the absolute value of the steering torque Tq is equal to or larger than the predetermined value W (S122: YES), the control unit 10 proceeds to S109, and executes the vibrating process similar to the first embodiment. When the control unit 10 determines that the absolute value of the steering torque Tq is smaller than the predetermined value W (S122: NO), the control unit 10 proceeds to S118 and skips adding the vibration in the steering torque Tq.

The absolute value of the steering torque Tq, which is smaller than the predetermined value (S122: NO), indicates that the vehicle travels straight ahead or travels along a curve, which has a curve rate smaller than a predetermined level. In this case, the steering wheel 91 is fixed or a microscopic correction steering is performed by the electric power steering apparatus 1. When the vehicle travels straight or when the microscopic correction steering is being performed, even a slight vibration of the steering wheel 91 may give a discomfort feeling to the driver. Thus, in the present embodiment, when the absolute value of the steering torque Tq is smaller than the predetermined value W (S122: NO), the control unit 10 skips adding the vibration to the steering torque Tq.

The vibrating process according to the present embodiment provides similar advantages to the advantages provided by the foregoing embodiments. In the present embodiment, when the steering torque Tq is smaller than the predetermined value W (S122: NO), the control unit 10 controls the electric motor 80 not to add the vibration in the output torque. That is, the control unit 10 skips adding the vibrating to the steering torque Tq. Thus, when the vehicle travels straight or when the microscopic correction steering is being performed, the electric power steering apparatus 1 according to the present embodiment avoids giving a discomfort feeling to the driver.

Further, the control unit 10 may skip the vibrating of the steering torque Tq when the rotation angle θh of the steering wheel 9115 smaller than a predetermined value, for example 5 degrees. Further, the control unit 10 may skip the vibrating of the steering torque Tq when the steering torque Tq is smaller than the predetermined value W or the rotation angle θh of the steering wheel 91 is smaller than the predetermined value. The electric power steering apparatus 1 according to the present embodiment provides similar advantages to the electric power steering apparatus 1 according to the forgoing embodiments. The process executed at S122 may be added to the vibrating processes according to the second, third, and fourth embodiments.

Other Embodiments

In the foregoing embodiments, the number of the threshold values in the vibrating process is set to three so that the vibration component of the vibration added to the steering torque Tq increases in a stepwise manner. Further, the number of the threshold values may be set larger than three. When the number of the threshold values increases, the fault occurred in the electric power steering apparatus 1 may be perceived by the driver via a detailed change in the vibration.

In the foregoing embodiments, the vibration component of the vibration added to the steering torque Tq increases in a stepwise manner. Further, the vibration component of the vibration added to the steering torque Tq may increase in a proportional manner or in an exponential manner.

In the first embodiment, the vibration component of the vibration added to the steering torque Tq is set based on the elapsed time from the fault detection time. Further, a driving time of the vehicle after the detection of the fault may be used as the elapsed time.

In the foregoing embodiments, the vibrating current, which causes the vibration in the steering torque Tq, is added to the current command value. Further, a voltage command value or other parameter may be used to add the vibration in the steering torque Tq.

In the foregoing embodiments, the maximum current provided to the properly-operating system maintains the same before and after the occurrence of the fault. Further, the maximum current provided to the properly-operating system may be set differently before and after the occurrence of the fault in order to compensate a driving loss caused by the faulty system. In this case, the maximum current in the properly-operating system after the occurrence of the fault needs to be set appropriately in order to avoid that an overload is applied to the inverter section of the properly-operating system.

When the fault occurs in one of the systems, a warning lamp or a buzz may be activated in addition to the vibrating process so that the fault is notified to the driver.

In the foregoing embodiments, the electric motor drive apparatus is applied to the electric power steering apparatus. Further, the electric motor drive apparatus may be applied to an apparatus other than the electric power steering apparatus.

While only the selected exemplary embodiments have been chosen to illustrate the present disclosure, it will be apparent to those skilled in the art from this disclosure that various changes and modifications can be made therein without departing from the scope of the disclosure as defined in the appended claims.

Furthermore, the foregoing description of the exemplary embodiments according to the present disclosure is provided for illustration only, and not for the purpose of limiting the disclosure as defined by the appended claims and their equivalents.

What is claimed is:

1. An electric motor drive apparatus, which drives an electric motor having a plurality of winding sets, comprising:
a plurality of inverter sections, each of which is arranged corresponding to one of the winding sets, a unit including each of the inverter sections and corresponding one of the winding sets being referred to as a system;
a plurality of relays, each of which controls a power supply to one of the inverter sections; and
a control unit that controls the inverter sections and the relays,
wherein the control unit includes:
an obtaining section that obtains a winding current that flows through each of the systems;
a determination section that determines whether a fault occurs in the systems based on the winding current flowing through each of the systems;
a specifying section that specifies one of the systems in which the fault occurs as a faulty system when the determination section determines that the fault occurs in the systems, one of the systems other than the faulty system being referred to as a properly-operating system;
an interrupting section that controls one of the relays corresponding to the faulty system to interrupt the power supply to the faulty system; and
a vibrating section that controls the inverter section of the properly-operating system to add a vibration to an output torque from the electric motor after the determination section determines that the fault occurs in the faulty system, the vibrating section gradually increases a vibration component of the vibration added to the output torque from the electric motor.

2. The electric motor drive apparatus according to claim 1, wherein each of the inverter sections is driven based on a current command value,
wherein the vibrating section adds a predetermined current to the current command value of the inverter section of the properly-operating system so that the vibration is added to the output torque, and
wherein the predetermined current added to the current command value of the inverter section of the properly-operating system corresponds to the vibration component of the vibration added to the output torque.

3. The electric motor drive apparatus according to claim 1, wherein the vibration component of the vibration added to the output torque is set based on an elapsed time after the fault occurs in the faulty system.

4. The electric motor drive apparatus according to claim 1, wherein the vibration component of the vibration added to the output torque is set based on the number of operation times of an ignition switch of a vehicle after the fault occurs in the faulty system.

5. The electric motor drive apparatus according to claim 1, wherein the vibration component of the vibration added to the output torque is set based on a travel distance of a vehicle after the fault occurs in the faulty system.

6. The electric motor drive apparatus according to claim 5, wherein the travel distance is estimated based on a speed of the vehicle.

7. The electric motor drive apparatus according to claim 1, wherein the motor performs a steering assist for a driver of a vehicle, and
wherein the vibrating section controls the inverter section of the properly-operating system to skip an adding of the vibration to the output torque when an absolute value of a steering torque, which is applied to a steering wheel of the vehicle by the driver, is smaller than a predetermined value.

8. An electric power steering apparatus comprising the electric motor drive apparatus according to claim 1.

* * * * *